United States Patent
Devasenapathi et al.

(10) Patent No.: US 10,017,626 B2
(45) Date of Patent: Jul. 10, 2018

(54) BOROSILICATE NANOPARTICLES AND METHOD FOR MAKING THE SAME

(71) Applicant: 3M INNOVATIVE PROPERTIES COMPANY, St. Paul, MN (US)

(72) Inventors: Appuswamy Devasenapathi, Singapore (SG); Rama V. Rajagopal, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/612,156

(22) Filed: Jun. 2, 2017

(65) Prior Publication Data
US 2017/0267831 A1 Sep. 21, 2017

Related U.S. Application Data

(62) Division of application No. 14/901,476, filed as application No. PCT/US2014/043441 on Jun. 20, 2014.

(60) Provisional application No. 61/840,196, filed on Jun. 27, 2013.

(51) Int. Cl.
| | | |
|---|---|---|
| C03B 19/10 | (2006.01) |
| C03C 3/064 | (2006.01) |
| C03C 3/089 | (2006.01) |
| C08K 3/38 | (2006.01) |
| C01B 33/20 | (2006.01) |
| C09K 21/02 | (2006.01) |

(52) U.S. Cl.
CPC ............... *C08K 3/38* (2013.01); *C01B 33/20* (2013.01); *C09K 21/02* (2013.01); *C01P 2002/82* (2013.01); *C01P 2004/61* (2013.01); *C01P 2004/62* (2013.01); *C01P 2004/64* (2013.01); *C08K 2201/005* (2013.01)

(58) Field of Classification Search
CPC ............ C03B 19/1065; C01P 2004/62; C01P 2004/64; C03C 3/064; C03C 3/089
See application file for complete search history.

(56) References Cited

U.S. PATENT DOCUMENTS

| | | |
|---|---|---|
| 6,270,627 B1 | 8/2001 | Keiser |
| 2005/0137291 A1 | 6/2005 | Schneider |

FOREIGN PATENT DOCUMENTS

| | | |
|---|---|---|
| CN | 101074101 A | 11/2007 |
| JP | H01-141832 | 6/1989 |

OTHER PUBLICATIONS

Machine-generated English translation of JP H01-141832 A.*
Ekin Ozturk Iglu's Master of Science in Chemistry thesis, 2011.*
Parashar et al., Nature Nanotechnology, vol. 3, Oct. 2008, 589-594.*
Tsvetkova et al., Glass Physics and Chemistry 2006, 32(2), 218-227.*

(Continued)

*Primary Examiner* — Vu A Nguyen
(74) *Attorney, Agent, or Firm* — Qiang Han; Gregory D. Allen

(57) ABSTRACT

Borosilicate nanoparticles and method of making borosilicate nanoparticles. Advantages of the method include making the borosilicate nanoparticles at temperatures not greater than 200° C. The nanoparticles made are useful, for example, as fillers in coatings, adhesives, and composite articles.

10 Claims, 5 Drawing Sheets

(56) References Cited

OTHER PUBLICATIONS

Beckett, "Formation of Borosilicate Glasses from Silicon Alkoxides and Metaborate Esters in Dry Non-Aqueous Solvents", Journal of Sol-Gel Science Technology, 2006, vol. 39, pp. 95-101.
Boris, "Sol-Gel Route to Carbon Nanotube Borosilicate Glass Composites", Composites: Part A, Jul. 2009, vol. 40, No. 6-7, pp. 837-845.
Christian, "Reticular Synthesis of Covalent Organic Borosilicate Frameworks", Journal of American Chemical Society, 2008, vol. 130, pp. 11872-11873.
Grandi, "$S_1O_2$—$B_2O_3$ Xerogels: The Problem of Boron Leaching", Journal of Non-Crystalline Solids, 2012, vol. 358, pp. 1631-1637, XP28491420.
Guglielmi, "Borosilicate coatings on mild steel", Journal of Non-Crystalline Solids, 1992, vol. 147&148, pp. 474-477.
Guglielmi, "Precursors for Sol-Gel Preparations", Journal of Non-Crystalline Solids, 1988, vol. 100, pp. 16-30.
Parashar, "Borosilicate Nanoparticles Prepared by Exothermic Phase Separation", Nature Nanotechnology, Sep. 2008, vol. 3, No. 10, pp. 589-594, XP55144694.
Parkhurst, "Siloxane Modified Sio2-TiO2 Glasses Via Sol-Gel", Material Research Society, Symposium Proceedings, 1986, vol. 73, pp. 769-773.
Rao, "A novel method for synthesis of silica nanoparticles", Journal of Colloid and Interface Science, 2005, vol. 289, pp. 125-131.
Schmidt, "Chemistry and Applications of Inorganic-Organic Polymers (Organically Modified Silicats)", Material Research Society, Symposium Proceedings, 1986, vol. 73, pp. 739-750.
Schmidt, "Chemistry of Material Preparation by the Sol-Gel Process", Journal of Non-Crystalline Solids, 1988, vol. 100, pp. 51-64.
Soraru, „Organically Modified SiO2—B2O3 Gels Displaying a HighContent of Borosiloxane (B—O—Si) Bonds, Chemistry of Materials, 1999, vol. 11, pp. 910-919.
Stober, "Controlled Growth of Monodisperse Silica Spheres in the Micron Size Range", Journal of Colloid and Interface Science, 1968, vol. 26, pp. 62-69.
Tsvetkova, "Sol-Gel Synthesis and Investigation of Hybrid Organic-Inorganic Borosilicate Nanocomposites", Glass Physics and Chemistry, 2006, vol. 32, No. 2, pp. 218-227, XP19296494.
Wang, "A Meso-Macroporous Borosilicate Monolith Prepared by a Sol-Gel Method", Microporous and Mesoporous Materials, 2012, vol. 151, pp. 250-254, XP28344043.
International Search Report for PCT International Application No. PCT/US2014/043441, dated Oct. 21, 2014, 4pgs.

* cited by examiner

BOROSILICATE NANOPARTICLES AND METHOD FOR MAKING THE SAME

BACKGROUND

A common method of making borosilicate nanoparticles is involves firing a mixture of boron and silicon containing oxides at a relatively high temperature(s) (i.e., 800° C.-1500° C.) to form the B—O—Si linkages.

Relatively low temperature (i.e., 50° C.-100° C.) sol-gel synthesis of borosilicates is also known wherein borosilicates are synthesized in the form of gels with Si—O—B linkages. However, these processes do not involve the separation of borosilicate particles as a separate entity, but are cast into borosilicate composite structures or coatings using the gel. A challenge in using a sol-gel process to synthesize mixed oxide nanoparticles is the difference in the reactivity of the precursors. For example, for borosilicate synthesis, the rate of hydrolysis and the subsequent oxide formation of boron precursors are several orders of magnitudes higher than that of the silica esters. This difference in the reactivity of the oxide precursors results in a physical mixture of individual oxides rather than cross polycondensed product, causing phase separation. To tailor the structure of the resulting materials it is necessary to control on the co-reactivity of the precursors.

Approaches to control the co-reactivity of two or more metal alkoxide species to avoid unnecessary phase separation include the use of chemical additives (e.g., glycols, organic acids (acetic acid), â-dicarbonyl ligands (ethyl acetoacetate (EACAC))) as chelating ligands to slow the hydrolysis and condensation reactions of non-silicate metal alkoxides. Although not wanting to be bound by theory, it is believed that after forming a complex with the chelating ligand, the species between metal and chelating agent is less easy to hydrolyze. However, the chelating ligand is believed to typically remain which alters the structure of the final network.

Another way to control the co-reactivity of two or more metal alkoxide species to avoid unnecessary phase separation is with chemically controlled condensation (CCC), wherein the hydrolysis of a fast-reacting alkoxide species is slowly initiated by the controlled release of water from the esterification of an organic acid with an alcohol. Once the fast-reacting alkoxide has been partially hydrolyzed and condensed, water is added to complete the overall reaction and to incorporate the slower reacting alkoxide.

Alternative methods for making borosilicate nanoparticles, preferably at lower temperatures, are desired.

SUMMARY

In one aspect, the present disclosure describes a plurality of borosilicate nanoparticles, wherein a majority of the boron of the borosilicate is tetragonally coordinated.

In another aspect, the method of making borosilicate nanoparticles, the method comprising:
heating at least
(a) at least one of a boron compound selected from a metaborate ester having the formula $(RO)_3(BO)_3$ or an alkoxy borane having the formula $B(OR)_3$, where R is an alkyl (e.g., methyl, ethyl, propyl, and butyl) or phenyl group); and
(b) at least one of a silane compound having the formula $Si(OR)_4$ or a silane compound having the formula $RSi(OR')_3$, where R is an alkyl, phenyl or a reactive group (e.g., a methacrylate, glycidyl or an amine) and R' is a alkyl or phenyl group
at at least one temperature and for a time sufficient to provide boroxine-silane adduct;
acidifying the boroxine-silane adduct to provide a borosilicate network; and
hydrolyzing the borosilicate network with ammonia to provide the borosilicate nanoparticles (e.g., borosilicate nanoparticles where a majority of the boron of the borosilicate is tetragonally coordinated).

Advantages of the method described herein for making borosilicate nanoparticles include making the borosilicate nanoparticles at temperatures not greater than 200° C. Advantages of borosilicate nanoparticles as an additive in heat resistant materials includes providing a relatively low coefficient of thermal expansion (CTE), chemical and corrosion resistance, and flame retardancy.

Nanoparticles described herein and/or made as described herein are useful, for example, as fillers in coatings, adhesives, and composite articles. Use of the borosilicate nanoparticles as a filler has been observed to lower the coefficient of thermal expansion (CTE) of acrylate polymers with loadings as low as 2 (in some embodiments, as low as 1) percent by weight of the borosilicate nanoparticles. Other property improvements use of the borosilicate nanoparticles may offer to materials include enhance durability, chemical resistance, and corrosion resistance, as well as an antimicrobial and fire retardant.

DETAILED DESCRIPTION

Figure 1:
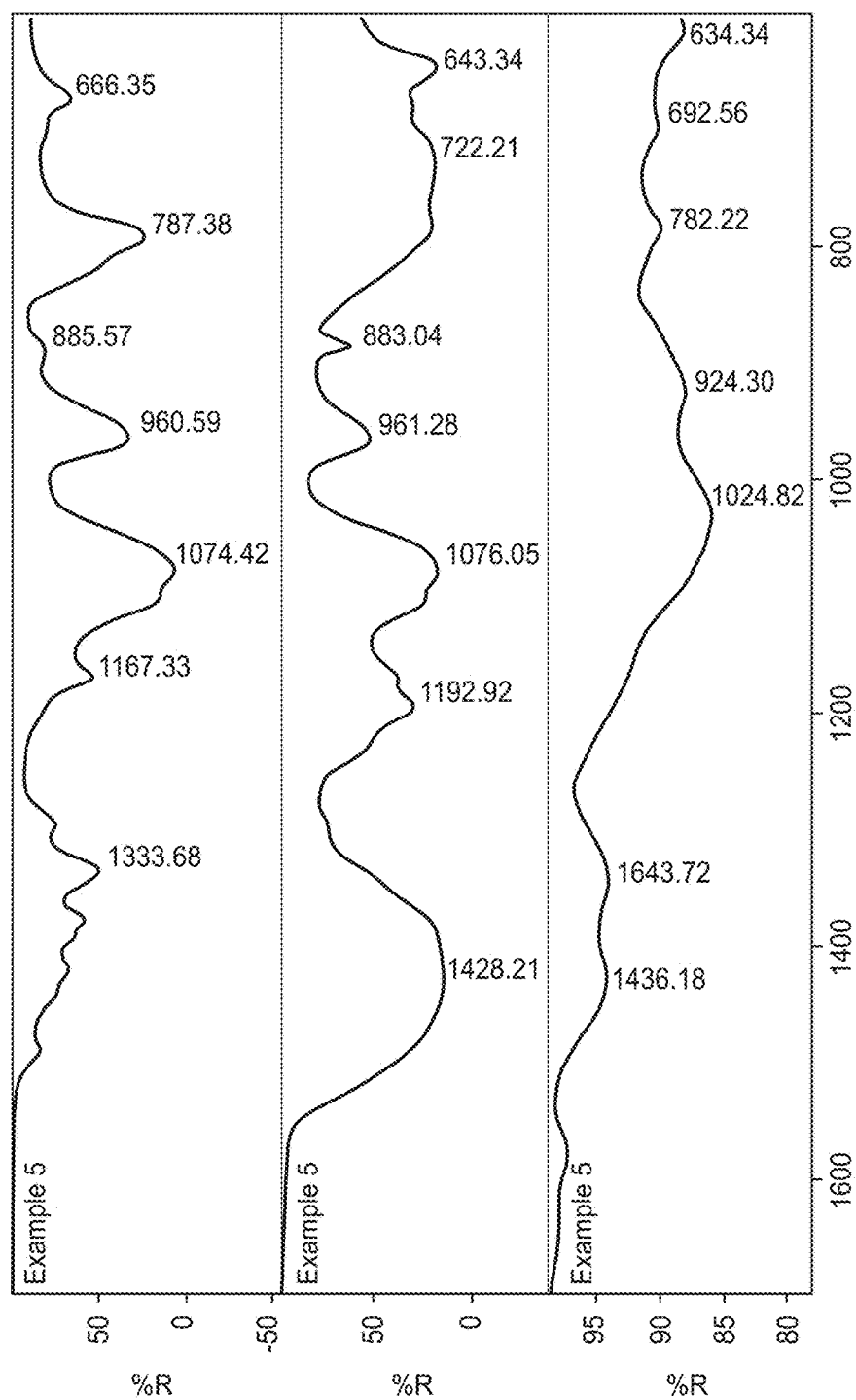
FIG. 1 is an FTIR spectra of an Example 5 during various stages of the method described herein.

Suitable boron and silane compounds are commercially available (e.g., tetraethyl orthosilicate (TEOS) and trimethoxy boroxine (TMB) are commercially available, for example, from Sigma-Aldrich Corporation, St. Louis, Mo.).

The ratio of the boron and silane compounds is preferably such that the resulting borosilicate nanoparticles have a B to Si ratio in the boroxine-silane adduct is in a range from 0.2 to 1.5 (in some embodiments, in a range from 0.4 to 0.9, 0.5 to 0.8, or even 0.5 to 0.75).

Typically the boron and silane compounds, and any other optional components are heated while stirring at a temperature(s) not greater than 200° C. (in some embodiments, not greater than 175° C., 150° C., 125° C., 100° C., 75° C., or even not greater than 50° C.). Heating can be carried out, for example, using an oil bath or a hot plate. The reaction is carried out in a round bottom flask with a reflux condenser or heated in a closed bottle under $N_2$ atmosphere.

Typically the heating is conducted in a range from 40° C. to 100° C. to provide the boroxine-silane adduct. Typically heating time to provide the boroxine-silane adduct is in a range from 15 minutes 5 hours (in some embodiments, in a range from 1 hour to 3 hours).

Optionally, the boroxine-silane adduct is diluted (typically while stirring) with at least one solvent prior to acidifying the boroxine-silane adduct. Exemplary solvents include ketones (e.g., acetone, methylethylketone, or tetrahydrofuran), esters (e.g., methylacetate or ethylacetate), alcohols (e.g., methanol, ethanol, 1-propanol, 2-propanol, 1-methoxy 2-propanol, or butanol) and chlorocarbons (e.g., dichloromethane or chloroform). The term "solvent" in this context means the media in which the reactants are completely miscible without any precipitation or phase separation.

Exemplary carboxylic acids for acidifying the boroxine-silane adduct include formic acid and acetic acid. Exemplary mineral acids for acidifying the boroxine-silane adduct include sulphuric acid, hydrochloric acid, and nitric acid.

The amount of acid required is monitored by measuring the pH which is maintained in the range of pH 2-5. Typically a few drops of acid is required to bring down the pH to 2-5 range. The acid concentration in the reaction mixture can vary between $10^{-2}$M-$10^{-5}$M.

Optionally, at least one surfactant (e.g., non-ionic, cationic, and anionic surfactants) is added to the boroxine-silane adduct prior to providing the borosilicate network. Exemplary non-ionic surfactants are available, for example, under the trade designations "TRITON X100" and "SPAN80" from Sigma-Aldrich Corporation. Exemplary cationic surfactants are available, for example, under the trade designations "CTAB" and "CTAC" from Sigma-Aldrich Corporation.

Exemplary anionic surfactants are available, for example, under the trade designation, "SDS" from Sigma-Aldrich Corporation.

Although not wanting to be bound by theory, it is believed acidification of the boroxine-silane adduct hydrolyzes the silane and boroxine functional groups to some extent to form the borosiloxane (—O—B—O—Si—O—B—O—) network. Further, it is believed this minimizes the individual hydrolysis of boroxine and silane, that results in physical mixture of oxides rather than borosilicate network.

Final hydrolysis of the borosilicate network is carried out using ammonia. Although not wanting to be bound by theory, it is believed an advantage of using ammonia is that hydrolysis typically happens within a few seconds, which is believed to help to maintain the borosilicate network in the particles formed. Typically the ammonia is added while stirring. As one example, typically for 10 ml of the TEOS and TMB reaction mixture, 0.5 ml of ammonia (about $10^{-1}$M) is needed to complete the hydrolysis. An exemplary range of ammonia concentration that may be useful is about $10^{-3}$M to about $10^{-1}$M. It is believed hydrolysis is complete when the reactant mixture becomes viscous and turns into a slurry. Typically the slurry is white.

The borosilicate nanoparticles are typically for the most part agglomerated in the slurry. Depending on the process conditions of the slurry, the borosilicate nanoparticles may have trigonal, tetragonal, or a mixture of both phases.

In some embodiments, the resulting borosilicate nanoparticles have particle sizes in a range in size from 5 nanometers to 1000 nanometers (in some embodiments, in a range from 5 nanometers to 500 nanometers, or even 5 nanometers to 100 nanometers)

Nanoparticles made as described herein are useful, for example, as fillers in as fillers in coatings, adhesives, and composite articles. Use of the borosilicate nanoparticles as a filler has been observed to lower the coefficient of thermal expansion (CTE) of acrylate polymers with loadings as low as 2 (in some embodiments, as low as 1) percent by weight of the borosilicate nanoparticles described or made as described herein. Other property improvements use of the borosilicate nanoparticles may offer to materials include enhance durability, chemical resistance, and corrosion resistance, as well as an anti-microbial and fire retardant.

In some embodiments a composite (e.g., a material, article, and layer (including a coating)) comprises a plurality of borosilicate nanoparticles made as described herein. In some embodiments, the composite comprises in a range of 1 to 50 (in some embodiments, in a range from 1 to 25, 1 to 40, or even 1 to 20) percent by weight of the borosilicate nanoparticles, based on the total weight of the composite. In some embodiments the composite further comprises thermoplastic polymer (e.g., acrylate or methacrylate) or a thermoset polymer (e.g., epoxy, urethane, or acrylate (e.g., ethoxylated bisphenol A diacrylate or dipentaerythritol pentacrylate) or methacrylate (e.g., cyclohexyl methacrylate)) matrix.

Composite layers described herein may be useful, for example, as a layer onto heat-generating devices (e.g., electronic devices or batteries), particularly where the low coefficient of thermal expansion characteristics of the composites afford the transport (i.e., dissipation, spreading) of heat without a significant change in the thickness of the layer. Advantages of the latter may include reduced delamination and device structural instability issues, as well as a thermal interface. Advantages of the composites may also include chemical corrosion resistance and flame retardancy facilitated by the borosilicate particles. Placement of the composite layer may include sandwiching it between two heat-generating devices or materials so the layer serves as a thermal interface and/or so heat generated is transported away by the composite layer. Layers of composites described here can be via conventional formation techniques including coating, extrusion and molding.

Examples of electronic devices which may comprises composites described herein include high intensity light emitting diodes (LEDs), heat sinks, heat spreaders, devices in integrated circuit (IC) packages, and power transistors).

Exemplary Embodiments

1. A plurality of borosilicate nanoparticles, wherein a majority of the boron of the borosilicate is tetragonally coordinated.

2. A composite comprising the plurality of borosilicate nanoparticles of Exemplary Embodiment 1 (in some embodiments, in an amount up to 50, 40, 30, 25, 20 15, 10, 5, 4, 3, 2, or even up to 1) percent by weight, based on the total weight of the composite).

3. The composite of Exemplary Embodiment 2 that includes at least one of a thermoplastic polymer (e.g., acrylate or methacrylate).

4. The composite of Exemplary Embodiment 2 or 3 that includes a thermoset polymer (e.g., epoxy, urethane, or acrylate (e.g., ethoxylated bisphenol A diacrylate or dipentaerythritol pentacrylate) or methacrylate (e.g., cyclohexyl methacrylate)) matrix.

5. The composite of Exemplary Embodiment 2 to 4 in the form of a layer (including a coating).

6. An electronic device (e.g., high intensity light emitting diodes (LEDs), heat sinks, heat spreaders, devices in integrated circuit (IC) packages, and power transistors) comprising a composite of any of Exemplary Embodiments 2 to 5.

7. A method of making borosilicate nanoparticles, the method comprising:
  heating at least
    (a) at least one of a boron compound selected from a metaborate ester having the formula $(RO)_3(BO)_3$ or an alkoxy borane having the formula $B(OR)_3$, where R is an alkyl; and
    (b) at least one of a silane compound having the formula $Si(OR)_4$ or a silane compound having the formula $RSi(OR')_3$, where R is an alkyl, phenyl or a reactive group (e.g., a methacrylate, glycidyl or an amine) and R' is a alkyl or phenyl group
  at at least one temperature and for a time sufficient to provide boroxine-silane adduct;
  acidifying the boroxine-silane adduct to provide a borosilicate network; and
  hydrolyzing the borosilicate network with ammonia to provide the borosilicate nanoparticles.
8. The method of Exemplary Embodiment 7 further comprising diluting the boroxine-silane adduct with at least one solvent prior to acidifying the boroxine-silane adduct.
9. The method of either Exemplary Embodiment 7 or 8, wherein the solvent is at least one of a ketone, ester, alcohol, or chlorocarbon.
10. The method of any of Exemplary Embodiments 7 to 9, wherein acidifying the boroxine-silane adduct is conducted with a carboxylic acid.
11. The method of any of Exemplary Embodiments 7 to 10, wherein the ratio of B to Si in the boroxine-silane adduct is in a range from 0.2 to 1.5.
12. The method of any of Exemplary Embodiments 7 to 11, wherein the heating is conducted at any temperature not greater than 200° C. (in some embodiments, not greater than 175° C., 150° C., 125° C., 100° C., 75° C., or even not greater than 50° C.).
13. The method of any of Exemplary Embodiments 7 to 12 further comprising adding at least one of a non-ionic surfactant, cationic surfactant, or anionic surfactant to the boroxine-silane adduct prior to providing the borosilicate network.
14. The method of any of Exemplary Embodiments 1 to 13, wherein the nanoparticles have particle sizes in a range in size from 5 nanometers to 1000 nanometers.
15. The method of any Exemplary Embodiments 1 to 14, wherein a majority of the boron of the borosilicate is tetragonally coordinated.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials

The trimethoxy boroxine (TMB), tetraethyl orthosilicate (TEOS), ammonia (28-30 weight %), and solvents, dichloromethane, ethanol, and methylethyl ketone (MEK), used to synthesize the borosilicate nanoparticles were obtained from Sigma-Aldrich Corporation, St. Louis, Mo. The acrylates, ethoxylated Bisphenol A Diacrylate and dipentaerythritol pentacrylate, used to synthesize the borosilicate nanoparticles were obtained from Sartomer Company, Exton, Pa., under the trade designations "SR 601" and "SR 399," respectively.

Examples 1-6

The amounts of TMB and TEOS reacted for Example 1 are listed in the Table, below.

TABLE

| Example | TMB, grams | TEOS, grams | Molar Ratio of TMB:TEOS | Molar Ratio, B:Si |
|---|---|---|---|---|
| 1 | 1.73 | 2.06 | 1:1 | 3 |
| 2 | 1.73 | 4.12 | 1:2 | 1.5 |
| 3 | 1.73 | 8.24 | 1:4 | 0.75 |
| 4 | 1.73 | 10.30 | 1:5 | 0.6 |
| 5 | 1.73 | 12.36 | 1:6 | 0.5 |
| 6 | 1.73 | 14.42 | 1:7 | 0.43 |

The reaction between TMB and TEOS was carried out using dichloromethane as the solvent. The TMB and TEOS were mixed in a round bottom flask using a magnetic stir bar at 50° C. under the $N_2$ atmosphere for 3 hours to form boroxine-silane adduct. The contents of the reaction mixture were cooled to room temperature (~25° C.). The boroxine-silane adduct was diluted to, by adding 30 percent by weight of dichloromethane to bring down the total solid content to 70 percent by weight. Drops of formic acid (HCOOH) were added to the diluted boroxine-silane adduct to bring the pH down from 6 to 2. The resulting contents were heated in an oil bath using a hot plate at 45° C. for 15 hours to complete the cross condensation. The solution remained clear at this stage.

Next, the solid content of the solution was further brought down to 50 percent by weight by adding ethanol. To this solution 1-5 drops ($10^{-5}$-$10^{-1}$M) of a non-ionic surfactant obtained under the trade designation "TRITON X-100" from Sigma-Aldrich) was added, and the solution mixed at 45° C. for 1 hour.

Next, concentrated ammonia ($NH_4OH$) solution (28-30 percent by weight in water) was added dropwise under at 1000 rpm mixing until the reactant mixture formed white particles and turned into a gel. At this point the ammonia additions were stopped. Typically for 10 ml of the reaction mixture, 0.5 ml of ammonia was required to complete the reaction.

The gel was redispersed in ethanol which formed a turbid sol and centrifuged again to obtain the precipitate. The redispersion in ethanol and centrifuging process was repeated thrice until all the residual ammonia was removed. The precipitate was dried in nitrogen.

Examples 2-6 were as described for Example 1, except the amounts of TMB and TEOS reacted for each Example are listed in the Table, above.

Fourier transform infrared (FTIR; obtained under the trade designation "NICOLET AVATAR 360" from Thermo Fisher, Waltham, Mass.) coupled with attenuated total reflectance (ATR) was used to characterize the reaction mixture at different stages of the reaction as well as after drying the precipitate to determine at which stage of the reaction the —B—O—Si— linkage was formed. For the FTIR analysis, the precipitates prepared according to the Examples obtained at different B:Si ratios were washed with ethanol solvent and centrifuged again to recover the borosilicate particles. This procedure was adopted so that any boric acid formed or loosely held with the particles during the hydrolysis would be washed away with ethanol. The ethanol washing and precipitation was done thrice until all the residual ammonia and loosely bound boric acid was removed.

The solid state magic angle spinning (MAS) nuclear magnetic resonance (NMR) analysis was carried out using the fine powders of the borosilicate particles in an NMR spectrometer (obtained under the trade designation "BRUKER DRX400" from Bruker Corp., Billerica, Mass.)

The particle morphology and size were characterized using scanning electron microscopy (SEM).

FIG. 1 shows the FTIR spectra of Example 5 at the start of the reaction (top), after acidifying the mixture (middle), and after formation of borosilicate precipitate after adding $NH_4OH$ and washing several times with ethanol.

Note that the peaks at 1167 $cm^{-1}$ corresponding to ($CH_3$ rock vibrations) seen at the beginning of the reaction (top spectrum), disappeared only after the completion of the reaction (i.e., the addition of $NH_4OH$) indicating the $CH_3$ groups were severed during the reaction and Si—O—B linkages were formed. Similarly, the peak at around 1074 $cm^{-1}$ corresponding to Si—O stretching vibrations broadened and shifted to around 1040 $cm^{-1}$ indicating the formation of Si—O—Si linkages.

The peak at about the 1300-1450 $cm^{-1}$ range with a peak maximum at 1333 $cm^{-1}$ corresponding to TMB at the beginning of the reaction broadened and moved towards the maximum at 1436 $cm^{-1}$. The broad peak at this wavelength was believed to be due to the boroxol and borate units along with Si—O—Si linkages. The absorption band at 1400-1480 $cm^{-1}$ was interpreted as indicating the vibrations of the trigonal boron atoms and the presence of traces of fourfold-coordinated boron atoms, which were possibly incorporated into the structure of the silicate network Finally the peak at 692 $cm^{-1}$ after the addition of $NH_4OH$ (bottom spectrum) was interpreted as indicative of the B—O—Si linkages and the coexistence of borate units in the silica network, which was expected to occur at about 675-690 $cm^{-1}$.

Figure 2:
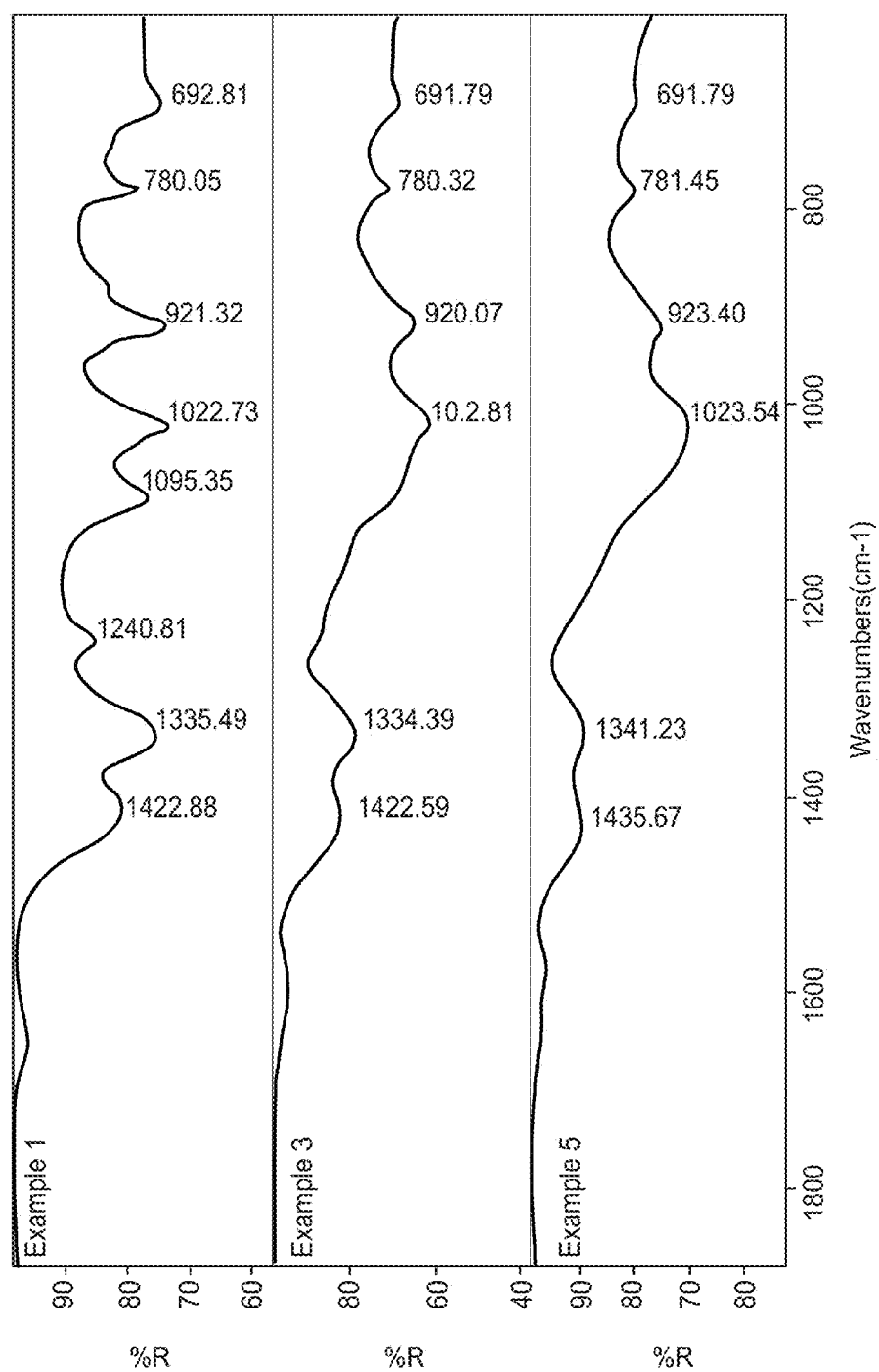
FIG. 2 is an FTIR spectra of Example 1, 3, and 5 borosilicate particles.

FIG. 2 shows the FTIR spectra of Examples 1 (top), 3 middle), and 5 (bottom) having B:Si ratios of 3, 0.75 and 0.5, respectively, after the borosilicate particle formation was completed.

For Example 5 (with a relatively high B:Si ratio of 3), the peak broadening at 1040 $cm^{-1}$ did not occur. Also, the intensity of the broad peak at 1400 $cm^{-1}$ for Example 5 was relatively high, indicating the formation of boron and silicon mixed oxides as the major products along with minor amounts of borosilicate particle formation.

For Examples 3 and 5 (with B:Si ratios of 0.75 and 0.5, respectively), peak broadening at 1040 $cm^{-1}$ was observed indicating the formation of Si—O—Si linkages and therefore the borosilicate particles.

An FTIR analysis of Examples 1-6 showed that when the B:Si ratio was equal to or higher than 1.5 (e.g., Examples 1 and 2), and equal to or lower than 0.43 (e.g., Example 6), the borosilicate particles formed at low yields leading to minor borosilicate phase in the resulting product.

Examples 4 and 5 borosilicate particles were subjected to solid state magic angle spinning (MAS) NMR analysis. The analysis was carried out using the fine powders of the borosilicate particles in an NMR spectrometer ("BRUKER DRX400"). From the $^{11}B$ solid state MAS NMR and the solid state $^{29}Si$ MAS-NMR, it was concluded that the particles formed in Examples 4 and 5 had the borosilicate (B—O—Si) network.

Figure 3A:
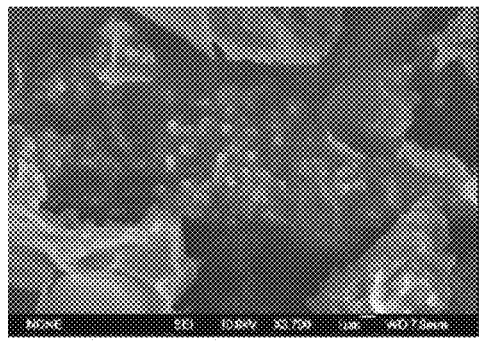
FIGS. 3a-3e, 4a, and 4b are Scanning Electron Microscopy (SEM) of various exemplary borosilicate particles prepared as working Examples.
Figure 3B:
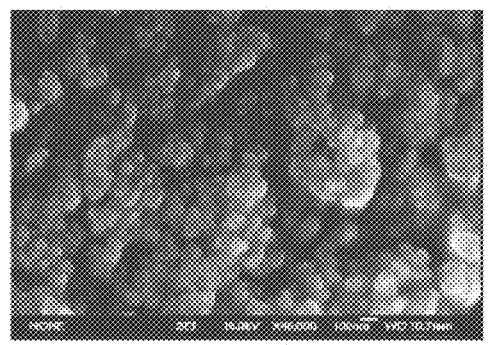
Figure 3C:
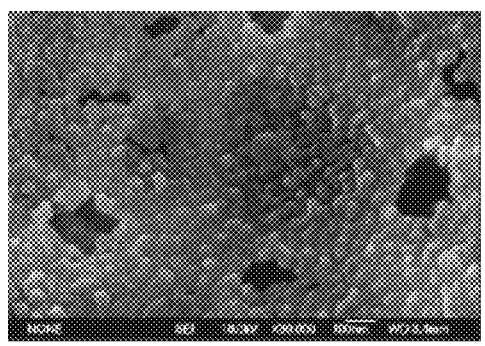
Figure 3D:
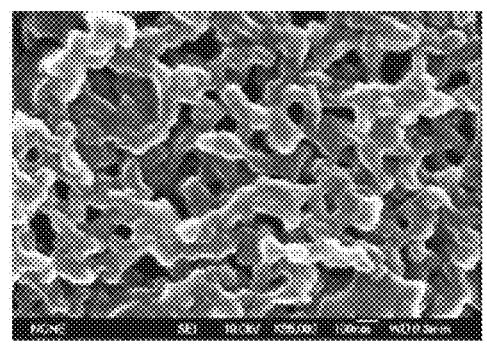
Figure 3E:
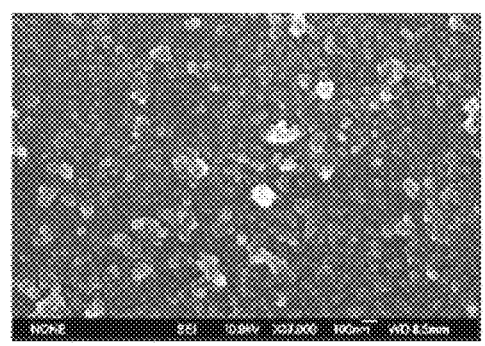

The microstructure of various borosilicate particles prepared from Examples 1-6 with different B:Si ratios were observed using Scanning Electron Microscopy (SEM), and representative micrographs are shown in FIGS. 3a-e. FIG. 3a is a photomicrograph at 3700X of Example 1 particles; FIG. 3b Example 3 particles at 40,000X; FIGS. 3c and 3d Example 4 particles at 80,000X and 55,000X; and FIG. 3e is a photomicrograph of the Example 6 particles at 37,000X.

Examples 7-12

Example 7-12 were prepared as described for Examples 1-6, respectively, except methyl ethyl ketone (MEK) was used in place the dichloromethane, and the acidified, diluted boroxine-silane was heated at 60° C. rather than at 45° C.

The FTIR spectra of the borosilicate particles synthesized in Examples 7-12 using MEK as the solvent also showed similar observations as noted above for Examples 1-6.

Figure 4A:
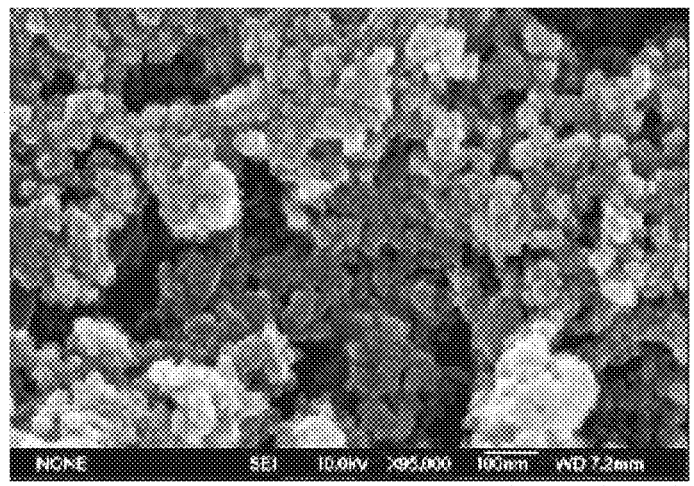
Figure 4B:
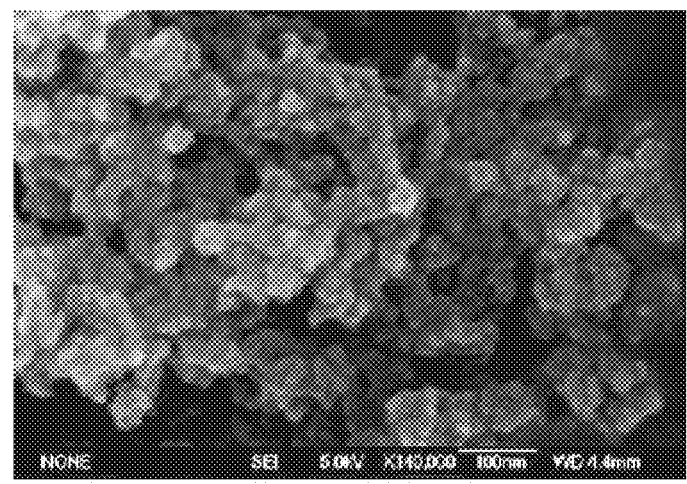

FIGS. 4a and 4b are SEM photomicrographs at 95,000X and 140,000X, respectively, of Example 9 and 11 borosilicate particles, respectively.

Comparative Examples 1-6

Comparative Examples 1-6 were prepared as described for Examples 1-6, respectively except that water was used for hydrolysis instead of ammonia. The use of water for the final hydrolysis of the TMB-TEOS reaction to form the borosilicate nanoparticles was not successful. Comparative Examples 1-6 either led to white precipitates with a very low yield, having a mixed particle morphology in the size range of 1-10 micrometers, or phase separation of the reaction mixture into an oily layer or turbid gel like residue.

Comparative Examples 7-12

Comparative Examples 7-12 were prepared as described for Examples 1-6, respectively, except that HCl was used for hydrolysis instead of ammonia. The use of HCl for the final hydrolysis of the TMB-TEOS reaction to form the borosilicate nanoparticles was not successful. Comparative Examples 7-12 either led a very low yields, or phase separation of the reaction mixture into an oily layer or turbid gel like residue.

Examples 13-15 and Comparative Example 13

Example 13 was prepared by dispersing Example 3 borosilicate particles in a 1:1 by weight blend of two resins (obtained under the trade designations "SR 601" and "SR399" resin containing 1 weight percent initiator (obtained under the trade designation "IRGACURE 184" from Sigma-Aldrich Corporation, St. Louis, Mo.), based on the total weight of the blend. The borosilicate particles dispersed in ethanol (2 weight percent borosilicate particles in ethanol) were added to the resin blend to result in a particle loading of 2 weight percent, based on the total cured weight. Excess solvent was stripped in a rotary evaporator, and the resin cast in 2.5 cm diameter, 5 mm thick molds. The mold mixture was conventionally cured under UV lamp equipped with a D-type bulb (Fusion UV Systems, Gaithersburg, Md.) with 0.945 W/$cm^2$ intensity exposed for 3 sec with UV dose of 2835 mJ/$cm^2$).

The resulting samples were analyzed for their coefficient of thermal expansion (TCE) using a thermomechanical analyzer (TMA; Model TMA Q400 series, obtained from TA Instruments, Castle, Del.) in the temperature range from 25° C.-300° C. at a heating rate of 5° C./min. for two heat cycles. The results of the second heat were used to determine CTE to avoid the effects of stress relaxation of the polymers cured under UV light.

Examples 14 and 15 and Comparative Example 13 were prepared as described for Example 13, except that their borosilicate particle content was 5, 10, and 0 (none) weight percent, respectively, based on the total cured weight of the resulting article.

Figure 5:
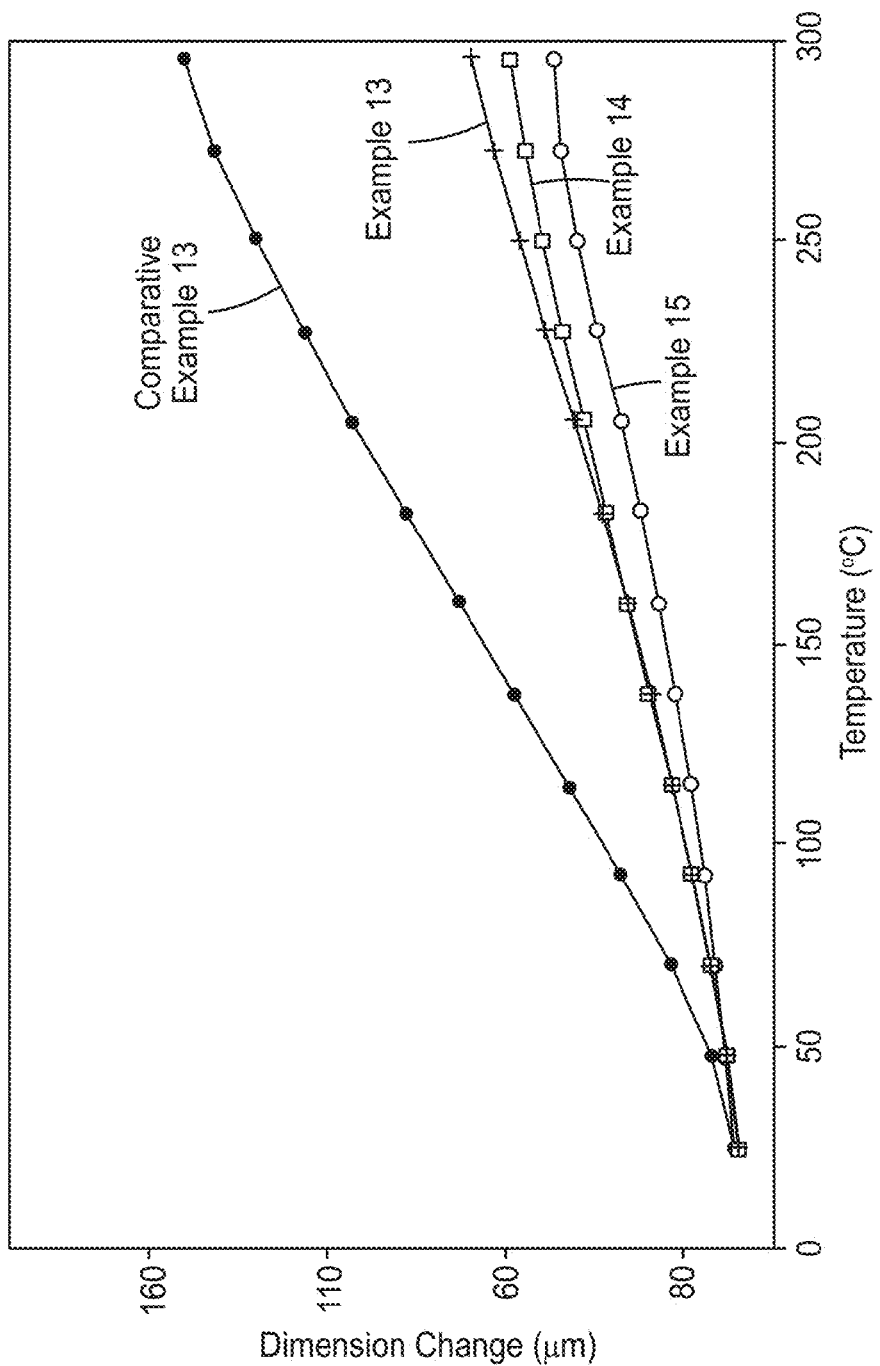
FIG. 5 is the coefficient thermal expansion (CTE) analysis results of Examples 13-15 and Comparative Example 13.

The CTE analysis results of the Examples 13-15 and Comparative Example 13 are shown in FIG. 5.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of making borosilicate nanoparticles, the method comprising:
   heating at least
   (a) at least one of a boron compound selected from a metaborate ester having the formula $(RO)_3(BO)_3$ or an alkoxy borane having the formula $B(OR)_3$, where R is an alkyl; and
   (b) at least one of a silane compound having the formula $Si(OR)_4$ or a silane compound having the formula $RSi(OR')_3$, where R is an alkyl, phenyl or a reactive group selected from a methacrylate group, a glycidyl group or an amine group, and R' is an alkyl or a phenyl
   at a temperature not greater than 200° C. for 15 minutes to 5 hours to provide boroxine-silane adduct;
   acidifying the boroxine-silane adduct to provide a borosilicate network; and
   hydrolyzing the borosilicate network with ammonia to provide the borosilicate nanoparticles.

2. The method of claim 1 further comprising diluting the boroxine-silane adduct with at least one solvent prior to acidifying the boroxine-silane adduct.

3. The method of claim 1, wherein the solvent is at least one of a ketone, ester, alcohol, or chlorocarbon.

4. The method of claim 1, wherein acidifying the boroxine-silane adduct is conducted with a carboxylic acid.

5. The method of claim 1, wherein the ratio of B to Si in the boroxine-silane adduct is in a range from 0.2 to 1.5.

6. The method of claim 1, wherein the heating is conducted at any temperature not greater than 100° C.

7. The method of claim 1, wherein the heating is conducted at any temperature not greater than 50° C.

8. The method of claim 1 further comprising adding a surfactant of non-ionic, cationic, or anionic to the boroxine-silane adduct prior to providing the borosilicate network.

9. The method of claim 1, wherein the nanoparticles have particle sizes in a range in size from 5 nanometers to 1000 nanometers.

10. The method of claim 1, wherein a majority of the boron of the borosilicate is tetragonally coordinated.

* * * * *